2,843,961

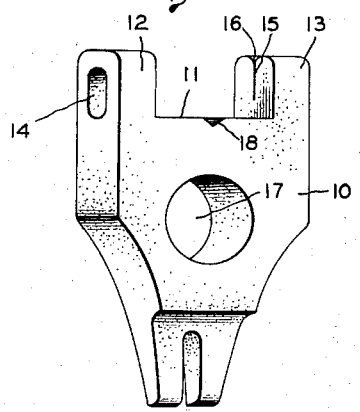
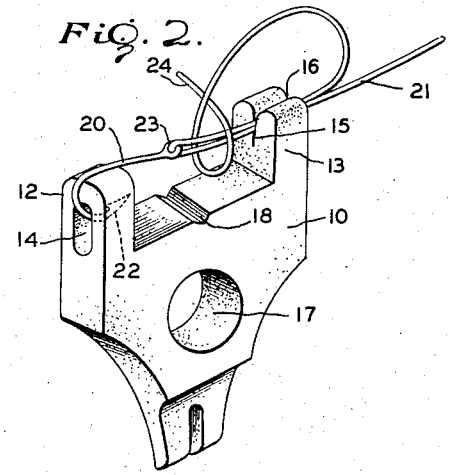
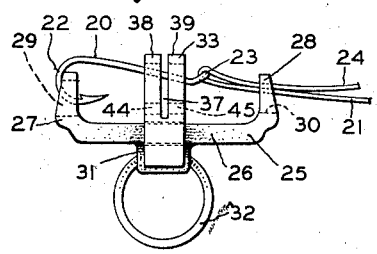
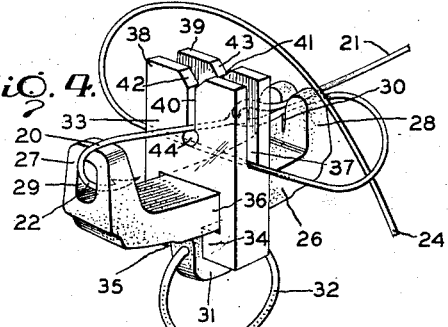
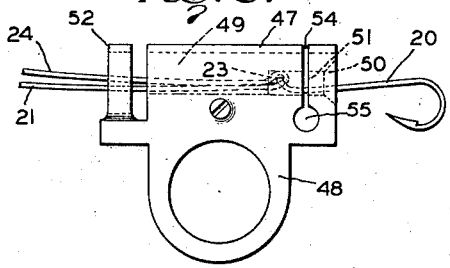
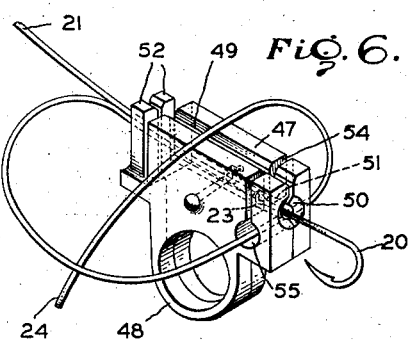
INVENTOR
James McKenzie Semple.
BY Cameron, Kerkam & Sutton
ATTORNEYS

United States Patent Office 2,843,961
Patented July 22, 1958

HOOK AND LEADER SUPPORTING STRUCTURE

James McKenzie Semple, Alexandria, Va.

Application January 6, 1954, Serial No. 402,508

6 Claims. (Cl. 43—1)

This invention relates to an improved structure and method for tying a leader to a hook or fly by supporting the eyed hook and leader under tension during the tying or knotting of the leader material about the hook.

In dry fly fishing it is essential to tie the leader around the shank of the hook just above the eye in order to make a cast which will result in proper presentation of the fly. For the strongest tie the bend of the leader about the fly should rest on the thread winding between the hackle and the eye. If the leader is simply tied to the eye the fly is likely to turn like a hinge on the leader during the cast and land on the water in the unnatural cocked or twisted position and will not be taken by a wary fish.

The weakest point in the tackle is the connection between fly and leader. When using a nylon leader in fly fishing it is essential to tie a good turl knot or figure eight, as it is well known that the other easily tied jam knots formerly used with gut leaders will not hold well with nylon. Because of the springy nature of a leader it is extremely difficult to tie a turl knot directly on the shank of a hook. It has become common practice to slide the fly down the leader, form the turl knot at the end of the leader and then slide the fly back up the leader through the loop to tighten the knot on the proper place on the hook without including part of the hackle in the knot. Few fishermen can do this perfectly.

It is therefore the primary object of this invention to provide a simplified hook and leader supporting structure that will not damage the most delicate fly, in or upon which the hook and leader may be maintained in proper position under tension so that the leader material may be either knotted upon itself or about the shank of the hook, as desired, by using a new tying method which eliminates the numerous difficulties previously attended upon this operation.

It is a further object of this invention to provide such a hook and leader holding structure which may be readily supported in one hand while the tying operation is performed by the other hand with the assistance of certain of the fingers of the supporting hand.

It is a further object of this invention to evolve such a structure which is readily adaptable to a wide range of hooks and to leaders of widely varying thickness.

It is another object of this invention to evolve such a structure which will permit the tyer to tie whatever type of knot he choses about the leader material or the hook shank and which will considerably facilitate the tying operation.

Other and further objects of this invention will become apparent as this specification proceeds.

Referring to the drawings, Fig. 1 is a perspective view of one embodiment of a hook and leader supporting structure made in accordance with the present invention;

Fig. 2 is a perspective view of this embodiment of the invention showing the hook and leader maintained under tension in the device with the terminal end of the leader material in knot tying position;

Fig. 3 is a side view, partially in phantom lines, of another embodiment of the invention, incorporating a central slide member, with the hook and leader material maintained under tension therein;

Fig. 4 is a perspective view, partially in phantom lines, of the embodiment of the invention shown in Fig. 3, with the leader passed through the central slot of the slide below the shank of the hook, in knot tying position;

Fig. 5 is a side view, partially in phantom, of an alternative embodiment of the invention showing the hook and leader maintained under tension in the supporting structure in position for the tying of the knot and Fig. 6 is a perspective view of this embodiment of the invention, partially in phantom, showing the leader material passed through the forward extremity of the supporting structure, about the shank of the hook, in knot tying position.

In the drawings, Fig. 1, 10 indicates a hook and leader holding structure which is preferably formed entirely or in part of resilient material such as rubber or plastic of an appreciable body and thickness and which is substantially rectangular in cross section at its upper extremity. The upper surface 11 is preferably plane and is provided at its two outer extremities with upstanding, substantially rectangular vertical shoulders 12 and 13 which, as shown, are preferably aligned and lie in the same vertical plane. Shoulder 12 is preferably provided with a central opening or recess 14 which is preferably substantially elliptical in shape and extends laterally completely through shoulder 12. Shoulder 13 is preferably vertically slitted at 15, slit 15 extending downwardly in shoulder 13 for approximately two-thirds of the height of shoulder 13 in a vertical plane parallel to the front and rear walls of shoulder 13. Slit 15 preferably extends downwardly in shoulder 13 to a distance substantially equal to the downward extent of orifice 14 in shoulder 12. The upper lateral walls of slit 15 are preferably rounded back in curved shoulders, as shown, to provide a suitable entering groove 16 extending across the top of shoulder 13. A circular orifice 17 is preferably provided centrally of support member 10 and is of sufficient diameter to accommodate a finger. Plain surface 11 at the extremity of structure 10 is preferably provided with a laterally disposed groove 18 which extends completely across its center surface.

Referring to Fig. 2, a hook 20 is provided with leader 21 is shown supported in supporting member 10, the forward bend 22 of hook 20 being disposed over the upper surface of shoulder 12, the barb and bend 22 thereof being disposed laterally through orifice 14 of shoulder 12. Leader material 21 is shown inserted through eye 23 of hook 20 and is doubled back upon itself and forced downwardly an appreciable distance into slit 15 of shoulder 13 with the free end of the leader on top to maintain hook 20 and the doubled extremities of leader 21 under tension at the upper extremity of retaining structure 10. With the hook and its doubled leader thus maintained under tension between shoulders 12 and 13 adequate free space is provided between plain surface 11 of holder 10 and the shank of hook 20 to permit tying any type of desired knot about the shank of hook 20 or about the doubled extremity of leader 21 or by first forming the knot loosely about the doubled leader adjacent to the hook and then sliding the small loop over the eye for final tightening, through the medium of free end 24 of leader 21.

Referring to Figs. 3 and 4 of the drawings another embodiment of the hook and leader supporting structure is shown. In this embodiment of the invention a substantially U-shaped, resilient holder structure 25 is provided, of rubber or analogous material. The base section 26 of member 25 is preferably rectangular in cross section, as shown, and is provided at its lateral extremities with upstanding shoulders 27 and 28. Shoulder 27 is preferably provided with a central recess 29, while shoulder 28 is provided with a central slit 30 which extends downwardly in shoulder 28 substantially to the level of base 26. Centrally disposed and extending downwardly from the lower surface of base 26 is a substantially rectangular depending stud 31 through which is passed a suitable retaining ring 32 to facilitate manual use of the holder.

Slideably mounted on rectangular base 26 is vertical guide member 33. Guide 33 is preferably formed of plastic or analogous material and as shown is preferably rectangular in cross section. Guide 33 is provided at its lower, outer extremities with rectangularly disposed shoulders 34 and 35 which define a rectangular recess 36 at the lower central extremity of guide 33 which closely and slideably engages about the upper, lateral and lower surfaces of base 26 whereby guide 33 is laterally slideable on base 26 between shoulders 27 and 28.

Guide 33 is preferably provided with a lateral slit 37 which extends the width thereof and extends downwardly in guide 33 to a point above the upper surface of base 26. The two opposed upper faces 38 and 39 of guide 33 are provided with vertically disposed slots 40 and 41 which lie in the same vertical plane and which extend downwardly to points an appreciable distance above the lower extremity of lateral slit 37. Aligned slots 40 and 41 are preferably provided at their upper extremities with V-shaped notches 42 and 43 and at their lower extremities with enlarged circular recesses 44 and 45.

Referring to Fig. 4, hook 20 is shown disposed over the upper surface of shoulder 27 with its bent and barbed lower extremity 22 passed through orifice 29 in shoulder 27, the shank portion of hook 20 being disposed downwardly through aligned slots 40 and 41 of guide 33 with eye 23 of hook 20 lying outwardly of the outer surface of guide 33 beyond slot 41. Leader 21 is shown doubled through the eye 23 of hook 20, its doubled extremities beyond eye 23 being pulled downwardly into slit 30 of shoulder 28 to maintain the hook and double leader combination in rigid position between shoulders 27 and 28, the central portion of the shank of hook 20 lying in slots 40 and 41 of guide 33. The terminal end 24 of leader 21 is shown pased through the lower extremity of lateral slot 37, under the shank of hook 20 and in position to be knotted on itself about the shank of hook 20 within lateral slot 37 of guide 33. As guide 33 is laterally slideable upon rectangular base 26 of support 25 it will be seen that by sliding guide 33 in the desired direction the knot may be applied, as desired, either about the shank of hook 20 or about the doubled extremity of leader 21 outwardly of eye 23 of hook 20. The provision of enlarged circular recesses 44 and 45 at the lower extremities of aligned slots 40 and 41 of guide 33 makes it possible to slide the guide 33 completely over the eye 23 of hook 20 when it is desired to apply the knot about the doubled leader outwardly of eye 23.

In the embodiments of the invention shown in Figs. 1-4, inclusive, a shouldered stud may be substituted for the orificed shoulders 12 and 27 shown, to provide support for the hook. If such a shouldered stud is used the hook will engage it, under the shoulder, in a horizontal position.

Figs. 5 and 6 disclose another embodiment of the holding structure in which two analogously molded halves are joined to form a substantially rectangular body 47. Body 47 may be molded in one piece, if desired. Each of the halves of rectangular body 47 is provided at its lower extremity with a downwardly depending ring 48 of sufficient size to pass over the finger of a hand to support the structure when the two halves are joined. Body 47 is provided with a longitudinally extending central slot 49 which is cut downwardly to a depth of approximately one-half the depth of body 47 and extends the length of body 47. Conical recess 50 is preferably provided in the outer end face of body 47 and is preferably centered on the lower extremity of longitudinal slot 49. The outer, lower extremity of slot 49 adjacent the center of concave recess 50 is preferably provided with an enlarged recess 51 which extends inwardly to a depth approximately equal to one-fourth the length of body 47. Recess 51 may be of any desired cross-section. It may be cylindrical, rectangular or inwardly tapered. Recess 51 is preferably on the order of twice the diameter of slot 49.

Each of the halves of body 47 is provided at its outer extremity with a vertical finger or friction member 52 in such fashion that when the two halves are joined fingers 52 bear closely against each other, their meeting, inner faces aligned with longitudinal slot 49 of body 47.

A lateral slot 54 is provided rectangularly disposed across the width of body 47 adjacent conical recess 50 and lying therebehind. Slot 54 preferably intersects longitudinal slot 49 at right angles and intersects recess 51 inwardly of concavity 50. The lower extremity of lateral slot 54 is preferably enlarged into cylindrical orifice 55 which extends through body 47.

A hook 20 is shown disposed within the concave recess 50 of body 47, the eye and a portion of the shank thereof being disposed within recess 51, the double leader 21 being positioned in longitudinal slot 49 and maintained under tension therein by means of external gripping fingers 52, the free end of the leader being disposed on top of the body thereof. The free or terminal end 24 of leader 21 is shown brought back through orifice 55 of lateral slot 54, whence it is passed inwardly under the shank of hook 20, and outwardly at the opposite side of body 47 to be brought back upon itself to tie an appropriate knot about the shank of hook 20. Eye 23 of hook 20 is pulled inwardly into recess 51 until it is stopped by the terminal shoulder thereof.

It will thus be seen that applicant has evolved three allied embodiments of a hook and leader retaining structure designed to hold the hook and its doubled leader extended under tension during the operation of tying the free end of the leader about itself or about the shank of the hook below the eye thereof.

Thus, in Fig. 1 there is shown an embodiment in which the body 10 is in part or entirely formed of resilient material provided with upwardly extending shoulder 12 and slitted shoulder 13, the bend of the hook fitting over the upper surface of shoulder 12, the barbed extremity thereof extending through the recess in shoulder 12 and the doubled leader carried by the eye of the hook being pulled downwardly into slot 15 of shoulder 13, with the free end on top, to maintain the hook and leader under extended horizontal position and under tension. With the hook in this position it is a simple matter to tie whatever knot is desired about the double leader or the shank of the hook by manipulating free end 24 of the leader 21. When tying a knot about the shank of the hook the knot can first be formed about the doubled leader and can then be readily slid along the doubled leader to the proper position on the shank of the hook adjacent the eye, the doubled leader serving as a guide.

In the embodiment illustrated in Figs. 3 and 4 of the drawing an additional slideable guide element 33 is incorporated between the resilient support members 27 and 28, guide 33 being so slideable on base 26 and being so slotted laterally and longitudinally that its position on the shank of the hook or on the doubled leader may be readily adjusted to guide the free end of the leader 24 into desired position thereabout. In this embodiment if it is desired to apply the knot about the double leader beyond the eye 23 of the hook 20 the slide or guide means 33 may be slid laterally on base 26, the eye of the hook passing through circular recesses 44 and 45 at the base of aligned slots 40 and 41, to position the free end of the leader 24 at the desired point under the doubled extremities of the leader outwardly of eye 23 of hook 20.

In the embodiment shown in Figs. 5 and 6 the doubled leader is first pulled downwardly in longitudinal slot 49 to the lower extremity of this slot, with the free end 24 of the leader on top. Tension is then applied to the doubled leader and the eye and shank of hook 20 are pulled into recess 51 at the lower extremity of slot 49 until the eye of the hook fetches up against the inner shouldered extremity of recess 51. The doubled leader and hook are maintained under tension in longitudinal slot 49 by gripping members 52, between which the leader is pulled. With the hook and leader thus seated in longitudinal slot 49 free end 24 is drawn around and inserted into orifice 55 at the lower extremity of lateral slot 54. Leader extremity 24 is then pushed inwardly through orifice 55 and lateral slot 54, under the shank of the hook 20 in recess 51 and is guided outwardly of the body 47 in slot 54. Extremity 24 may then be knotted about leader 21 in any desired fashion to provide a knot about the shank of hook 20. With the knot appropriately tied about the shank of hook 20 the doubled extremities of the leader are pulled upwardly from between gripping members 52 and out of longitudinal slot 49, the long end 21 is drawn out horizontally to draw the slack through the eye of the hook and set the knot in place on the shank of the hook and the eye of the hook is freed from recess 51, to complete the operation.

The hook and leader supporting structure is so designed as to be susceptible of use with hooks and leaders of widely varying sizes and types. The primary object is to maintain the hook and the doubled leader passed through the eye of the hook under tension during the time when the knot in the free end of the leader is applied about the shank of the hook or about the two doubled lengths of the leader in order that the knot may be more readily tied and in order that complicated knots may be tied with facility.

This matter of maintaining the leader as it extends from the eye of the hook under tension at the time of tying the knot either about the shank of the hook or about the leader itself is of the utmost importance to insure the tying of a perfect knot and to obviate errors in tying. The invention broadly comprises the provision of opposed hook and leader holding members, about one of which the hook is positioned and within the other of which the leader is held to maintain the hook and leader combination under tension and easily accessible during the knotting of the leader.

Three allied embodiments of the invention are illustrated in this specification. The invention is susceptible of numerous analogous embodiments without departing from the spirit thereof.

The proportions of the various parts may be varied at will and equivalents may be substituted for any and all elements of the combination without departing from the spirit of the invention.

Attention is directed to the appended claims for a limitation of the scope of the invention.

What is claimed is:

1. In a supporting structure for leadered hooks in which the leader is doubled back from the eye of the hook, a support body, a central slot running longitudinally of said body, a lateral slot disposed in said body at right angles to said central slot, a central recess let into said body in extension of said longitudinal slot and intersecting said lateral slot, strand holding means disposed adjacent the extremity of said longitudinal slot whereby a leadered hook may be inserted into said central recess at the extremity of said longitudinal slot and its doubled leader held under tension therein by said strand holding means, the free end of said leader being passed through said lateral slot under the shank of the hook for the tying of a knot thereabout.

2. In a supporting structure for leadered hooks in which the leader is doubled back from the eye of the hook, a support body, a central slot running longitudinally of said body, a lateral slot disposed in said body at right angles to said central slot, a central recess in said body in extension of said longitudinal slot and intersecting said lateral slot, strand holding members disposed outwardly of said body adjacent the extremity of said longitudinal slot whereby a leadered hook may be inserted into said central recess at the extremity of said longitudinal slot and its doubled leader held under tension therein by said strand holding members, the free end of said leader being passed through said lateral slot under the shank of the hook for the tying of a knot thereabout.

3. In a supporting structure for leadered hooks in which the leader is doubled back from the eye of the hook, a support body, a central slot running longitudinally of said body, a lateral slot disposed in said body at right angles to said central slot and enlarged at its base to form a transverse passage beneath said central slot, an end recess let into said body in extension of said longitudinal slot and intersecting said lateral slot, gripping means disposed outwardly of said body adjacent the extremity of said longitudinal slot whereby a leadered hook may be inserted into said end recess at the extremity of said longitudinal slot and its doubled leader held under tension therein by said gripping means, the free end of said leader being passed through said lateral slot under the shank of the hook for the tying of a knot thereabout.

4. In a supporting structure for leadered hooks in which the leader is doubled back from the eye of the hook, a support body, a central slot running longitudinally of said body, a lateral slot disposed in said body at one end thereof at right angles to said central slot and running through said body, a cylindrical recess let into said body in extension of said longitudinal slot and intersecting said lateral slot, gripping members disposed outwardly of said body adjacent the extremity of said longitudinal slot whereby a leadered hook may be inserted into said cylindrical recess at the extremity of said longitudinal slot and its doubled leader held under tension therein by said gripping members, the free end of said leader being passed through said lateral slot under the shank of the hook for the tying of a knot thereabout.

5. In a supporting structure for leadered hooks in which the leader is doubled back from the eye of the hook, a support body, a central slot running longitudinally of said body, a lateral slot disposed in said body at right angles to said central slot and running horizontally through said body, a central recess let into said body in extension of the bottom of said longitudinal slot and intersecting said lateral slot, gripping fingers disposed outwardly of said body adjacent the extremity of said longitudinal slot whereby a leadered hook may be inserted into said central recess at the extremity of said longitudinal slot and its doubled leader held under tension therein by said gripping fingers, the free end of said leader being passed through said lateral slot under the shank of the hook for the tying of a knot thereabout.

6. In a supporting structure for leadered hooks in which the leader is doubled back from the eye of the hook, a unitary support body of compressible material having upstanding shoulders disposed at the opposite extremities thereof and a downwardly extending leg, said leg having a finger accommodating aperture formed therethrough, one of said shoulders having a centrally disposed orifice formed therethrough and the other of said shoulders having a central slit formed therein from the upper surface thereof and aligned with said orifice in such a manner that a leadered hook may be disposed over said orificed shoulder and the doubled leader may be inserted downwardly into and held under tension in said slitted shoulder preparatory to the tying of a knot about the leader or the shank of said hook.

References Cited in the file of this patent

UNITED STATES PATENTS

| | | | |
|---|---|---|---|
| 1,288,322 | Webb | Dec. 17, | 1918 |
| 2,225,309 | Lawrence | June 17, | 1940 |
| 2,236,781 | Pannier | Apr. 1, | 1941 |
| 2,239,342 | Rosenfelder et al. | Apr. 22, | 1941 |
| 2,486,142 | Fong | Oct. 25, | 1949 |
| 2,502,751 | Roberts | Apr. 4, | 1950 |
| 2,601,605 | Fulvio | June 24, | 1952 |
| 2,646,298 | Leary | July 21, | 1953 |
| 2,734,299 | Masson | Feb. 14, | 1956 |